(12) United States Patent
Fielding et al.

(10) Patent No.: US 11,683,434 B2
(45) Date of Patent: Jun. 20, 2023

(54) INTEGRATED PHYSICAL WAREHOUSE AND DIGITAL DOCUMENT MANAGEMENT SYSTEM

(71) Applicant: RIPCORD INC., Hayward, CA (US)

(72) Inventors: Alex Fielding, Hayward, CA (US);
Kevin C. Hall, Hayward, CA (US);
Kirk H. Knight, Hayward, CA (US);
Kimberly Lembo, Hayward, CA (US)

(73) Assignee: Ripcord Inc., Hayward, CA (US)

( * ) Notice: Subject to any disclaimer, the term of this patent is extended or adjusted under 35 U.S.C. 154(b) by 0 days.

(21) Appl. No.: 17/412,508

(22) Filed: Aug. 26, 2021

(65) Prior Publication Data
US 2022/0038598 A1 Feb. 3, 2022

Related U.S. Application Data

(63) Continuation of application No. 16/251,693, filed on Jan. 18, 2019, now Pat. No. 11,134,166, which is a
(Continued)

(51) Int. Cl.
*H04N 1/04* (2006.01)
*H04N 1/21* (2006.01)
(Continued)

(52) U.S. Cl.
CPC ......... *H04N 1/2166* (2013.01); *G06F 16/113* (2019.01); *G06F 16/182* (2019.01);
(Continued)

(58) Field of Classification Search
CPC ............. H04N 1/2166; H04N 1/00135; H04N 1/00236; H04N 1/00795; H04N 1/00127;
(Continued)

(56) References Cited

U.S. PATENT DOCUMENTS 4,097,042 A 6/1978 Rozga
4,488,466 A 12/1984 Jones
(Continued)

FOREIGN PATENT DOCUMENTS

CN 101665197 A 3/2010
CN 201741888 U 2/2011
(Continued)

OTHER PUBLICATIONS

Canon. Canon solutions america. Monochrome Digital Press brochure. 2015. Available at https://csa.canon.com/online/wcm/connect/csa/03bf465e-31c2-4ba1-a8b6-fee511a9117c/varioPrint-135-120-110-Brochure.pdf?MOD=AJPERES. Accessed on Mar. 27, 2017.
(Continued)

*Primary Examiner* — Cheukfan Lee
(74) *Attorney, Agent, or Firm* — Wilson Sonsini Goodrich & Rosati

(57) ABSTRACT

A document management facility may process volumes of physical documents for digital imaging. The document management facility may utilize robotic apparatus to perform the various functions for processing the documents, which may include document intake, document storage, document digitization, and/or document removal. Digital versions of the documents may be accessed with a document management system.

20 Claims, 4 Drawing Sheets

Related U.S. Application Data continuation of application No. 15/383,292, filed on Dec. 19, 2016, now Pat. No. 10,187,542.

(60) Provisional application No. 62/233,954, filed on Dec. 19, 2015.

(51) Int. Cl.

| | | |
|---|---|---|
| *H04N 1/00* | (2006.01) | |
| *G06F 16/93* | (2019.01) | |
| *G06F 16/11* | (2019.01) | |
| *G06F 16/182* | (2019.01) | |

(52) U.S. Cl.
CPC ......... *G06F 16/93* (2019.01); *H04N 1/00135* (2013.01); *H04N 1/00236* (2013.01); *H04N 1/00795* (2013.01); *H04N 1/00127* (2013.01); *H04N 2201/3225* (2013.01); *H04N 2201/3242* (2013.01)

(58) Field of Classification Search
CPC .... H04N 2201/3225; H04N 2201/3242; G06F 16/182; G06F 16/93; G06F 16/113
See application file for complete search history.

(56) References Cited

U.S. PATENT DOCUMENTS

| | | |
|---|---|---|
| 4,632,377 A | 12/1986 | Browse |
| 4,699,365 A | 10/1987 | Smith et al. |
| 4,814,798 A | 3/1989 | Fukae et al. |
| 5,019,249 A | 5/1991 | Sugai et al. |
| 5,087,027 A | 2/1992 | Acquaviva |
| 5,093,674 A | 3/1992 | Storlie |
| 5,203,554 A | 4/1993 | Suzuki et al. |
| 5,274,418 A | 12/1993 | Kazami et al. |
| 5,377,022 A | 12/1994 | Street et al. |
| 5,458,232 A | 10/1995 | Novak et al. |
| 5,501,571 A | 3/1996 | Van Durrett et al. |
| 5,568,281 A | 10/1996 | Kochis et al. |
| 5,592,576 A | 1/1997 | Hayashi |
| 5,835,839 A | 11/1998 | Kaneda |
| 5,847,405 A | 12/1998 | Acquaviva et al. |
| 6,059,284 A | 5/2000 | Wolf et al. |
| 6,074,334 A | 6/2000 | Mennie et al. |
| 6,196,393 B1 | 3/2001 | Kruk, Jr. et al. |
| 6,344,902 B1 | 2/2002 | Duke et al. |
| 6,476,376 B1 | 11/2002 | Biegelsen et al. |
| 6,574,014 B2 | 6/2003 | Mandel et al. |
| 6,606,171 B1 | 8/2003 | Renk et al. |
| 6,955,348 B2 | 10/2005 | Koga et al. |
| 7,069,278 B2 | 6/2006 | Telkowski et al. |
| 7,561,738 B2 | 7/2009 | Zou et al. |
| 7,734,446 B2 | 6/2010 | Squibbs et al. |
| 7,867,593 B2 | 1/2011 | Hoshino et al. |
| 8,056,872 B2 | 11/2011 | Kozera |
| 8,414,993 B2 | 4/2013 | Nakazono et al. |
| 8,693,043 B2 | 4/2014 | Schmidtler et al. |
| 9,025,213 B1 | 5/2015 | Irons et al. |
| 9,068,920 B2 | 6/2015 | Churilla et al. |
| 9,460,356 B2 | 10/2016 | Irons et al. |
| 9,886,436 B2 | 2/2018 | Ghatage et al. |
| 10,187,542 B1 | 1/2019 | Fielding et al. |
| 10,267,750 B2 | 4/2019 | Vild et al. |
| 10,289,930 B2 | 5/2019 | Vild et al. |
| 10,307,982 B2 | 6/2019 | Adams et al. |
| 10,442,644 B1 | 10/2019 | Zakharov et al. |
| 10,542,167 B2 | 1/2020 | Fielding et al. |
| 10,720,765 B2 | 7/2020 | Serdynski et al. |
| 10,778,858 B2 | 9/2020 | Fielding et al. |
| 10,798,261 B2 | 10/2020 | Hall et al. |
| 10,951,786 B2 | 3/2021 | Fielding et al. |
| 11,089,175 B2 | 8/2021 | Hall et al. |
| 11,134,166 B2 | 9/2021 | Fielding et al. |
| 11,240,392 B2 | 2/2022 | Fielding et al. |
| 11,339,019 B2 | 5/2022 | Hall et al. |
| 11,516,359 B2 | 11/2022 | Hall et al. |
| 2002/0111960 A1 | 8/2002 | Irons et al. |
| 2003/0168308 A1 | 9/2003 | Maier et al. |
| 2004/0022563 A1 | 2/2004 | Maruchi et al. |
| 2004/0187579 A1 | 9/2004 | Yabuta et al. |
| 2004/0207707 A1 | 10/2004 | Ohashi et al. |
| 2004/0252355 A1 | 12/2004 | Chen |
| 2005/0006839 A1 | 1/2005 | Oomori et al. |
| 2005/0087422 A1 | 4/2005 | Maier et al. |
| 2005/0211200 A1 | 9/2005 | Liang et al. |
| 2005/0212200 A1 | 9/2005 | Van Nice et al. |
| 2005/0240376 A1 | 10/2005 | Uwatoko et al. |
| 2005/0285323 A1 | 12/2005 | Gulbrandsen et al. |
| 2006/0122858 A1* | 6/2006 | Miles ................. G06Q 30/0601 705/28 |
| 2007/0006754 A1 | 1/2007 | Eckart et al. |
| 2007/0018376 A1 | 1/2007 | Sano et al. |
| 2007/0091371 A1 | 4/2007 | Sugihara |
| 2007/0264063 A1 | 11/2007 | Sano et al. |
| 2007/0296140 A1 | 12/2007 | Babanats et al. |
| 2008/0004904 A1 | 1/2008 | Tran |
| 2009/0037444 A1 | 2/2009 | Stapleton |
| 2010/0067071 A1 | 3/2010 | Rozenfeld et al. |
| 2010/0220343 A1 | 9/2010 | Horikawa et al. |
| 2010/0301547 A1 | 12/2010 | Prabhat et al. |
| 2011/0285874 A1 | 11/2011 | Showering et al. |
| 2011/0290851 A1 | 12/2011 | Shelton, IV |
| 2012/0003024 A1 | 1/2012 | Kaiga et al. |
| 2012/0013957 A1 | 1/2012 | Honda |
| 2012/0141148 A1 | 6/2012 | Ohshima et al. |
| 2012/0251288 A1 | 10/2012 | Suzuki et al. |
| 2013/0010321 A1 | 1/2013 | Shen |
| 2013/0141766 A1 | 6/2013 | Iwamatsu et al. |
| 2013/0160663 A1 | 6/2013 | De Gaillande |
| 2013/0170001 A1 | 7/2013 | Takahata et al. |
| 2013/0236227 A1 | 9/2013 | Hirako |
| 2013/0242355 A1 | 9/2013 | Morita et al. |
| 2013/0307213 A1 | 11/2013 | Adachi |
| 2014/0153070 A1 | 6/2014 | Harada et al. |
| 2014/0168731 A1 | 6/2014 | Nakayoshi et al. |
| 2014/0192386 A1 | 7/2014 | Ishida |
| 2014/0341438 A1 | 11/2014 | Parkov et al. |
| 2015/0048566 A1 | 2/2015 | Utagawa et al. |
| 2015/0133281 A1 | 5/2015 | Hirose |
| 2015/0186760 A1 | 7/2015 | Albrecht |
| 2015/0234790 A1* | 8/2015 | Irons ..................... G06Q 10/10 715/273 |
| 2015/0341509 A1 | 11/2015 | Yamada |
| 2016/0026140 A1 | 1/2016 | Oomoto et al. |
| 2016/0170355 A1 | 6/2016 | Heishi et al. |
| 2016/0227181 A1 | 8/2016 | Ilic et al. |
| 2019/0100398 A1 | 4/2019 | Nakayoshi et al. |
| 2019/0161299 A1 | 5/2019 | Egawa et al. |
| 2019/0161301 A1 | 5/2019 | Maeyama et al. |
| 2020/0079608 A1 | 3/2020 | Hall et al. |
| 2020/0084331 A1 | 3/2020 | Hall et al. |
| 2020/0099812 A1 | 3/2020 | Ishii |
| 2021/0075918 A1 | 3/2021 | Tomii |
| 2021/0227085 A1 | 7/2021 | Fielding et al. |
| 2021/0377411 A1 | 12/2021 | Hall et al. |

FOREIGN PATENT DOCUMENTS

| | | |
|---|---|---|
| CN | 102170507 A | 8/2011 |
| CN | 202185902 U | 4/2012 |
| CN | 102730446 A | 10/2012 |
| CN | 102741888 A | 10/2012 |
| CN | 103685840 A | 3/2014 |
| CN | 103854022 A | 6/2014 |
| EP | 0731596 A1 | 9/1996 |
| EP | 1862978 A2 | 12/2007 |
| JP | S58139939 A | 8/1983 |
| JP | S5978877 A | 5/1984 |
| JP | S62137963 A | 6/1987 |
| JP | H03292276 A | 12/1991 |
| JP | H10194526 A | 7/1998 |
| JP | H11130297 A | 5/1999 |
| JP | 2000108053 A | 4/2000 |

(56) References Cited

FOREIGN PATENT DOCUMENTS

| JP | 2000246668 A | 9/2000 |
|---|---|---|
| JP | 2000263470 A | 9/2000 |
| JP | 2005012783 A | 1/2005 |
| JP | 2006091980 A | 4/2006 |
| JP | 2006270560 A | 10/2006 |
| JP | 2007039113 A | 2/2007 |
| JP | 2007238252 A | 9/2007 |
| JP | 2007323501 A | 12/2007 |
| JP | 2009001359 A | 1/2009 |
| JP | 2010189169 A | 9/2010 |
| JP | 2011063332 A | 3/2011 |
| JP | 2012210986 A | 11/2012 |
| JP | 2013129521 A | 7/2013 |
| JP | 2013173618 A | 9/2013 |
| JP | 2015147271 A | 8/2015 |
| JP | 2015180981 A | 10/2015 |
| JP | 2016222451 A | 12/2016 |
| KR | 101257206 B1 | 4/2013 |
| WO | WO-2016194703 A1 | 12/2016 |
| WO | WO-2017106856 A1 | 6/2017 |
| WO | WO-2018175631 A1 | 9/2018 |
| WO | WO-2018175644 A1 | 9/2018 |

OTHER PUBLICATIONS

Co-pending U.S. Appl. No. 17/345,953, inventors Hall; Kevin Christopher et al., filed Jun. 11, 2021.
EP16876924.8 The Extended European Search Report dated Jul. 22, 2019.
EP18772300.2 Extended European Search Report dated Nov. 5, 2020.
EP18772475.2 European Search Report dated Nov. 23, 2020.
EP20174330.9 European Search Report dated Oct. 28, 2020.
International Search Report and Written Opinion dated May 22, 2017 for International PCT Patent Application No. PCT/US2016/067583.
Jacquin, O. et al., Self-aligned setup for laser optical feedback imaging insensitive to parasitic optical feedback. Applied optics, Optical Society of America, 2009, 48, pp. 64. <10.1364/AO.48.000064>. Available at https://hal.archives-ouvertes.fr/hal-00951764. Accessed on Mar. 27, 2017.
Konica Minolta. Bizhub pro 1200/1051 specifications. Available at https://www.biz.konicaminolta.com/production/1200_1051/pdf/1200_1051catalog.pdf. Accessed on Mar. 22, 2017.
Panasonic Corp. Document Scanner—ToughFeed—Innovative Paper Feed Mechanism. Dated Feb. 6, 2017.
PCT/US2018/023626 International Search Report and Written Opinion dated Jul. 12, 2018.
PCT/US2018/023641 International Search Report and Written Opinion dated Jul. 13, 2018.
U.S. Appl. No. 16/571,387 Notice of Allowance dated Jun. 19, 2020.
U.S. Appl. No. 16/708,700 Notice of Allowance dated Jul. 22, 2020.
U.S. Appl. No. 16/708,700 Notice of Allowance dated Jun. 1, 2020.
U.S. Appl. No. 16/708,700 Notice of Allowance dated May 14, 2020.
U.S. Appl. No. 15/383,292 Notice of Allowance dated Nov. 26, 2018.
U.S. Appl. No. 15/383,292 Office Action dated Mar. 26, 2018.
U.S. Appl. No. 15/383,292 Office Action dated Sep. 19, 2018.
U.S. Appl. No. 16/571,424 Office Action dated Jun. 15, 2021.
U.S. Appl. No. 16/251,693 Notice of Allowance dated Aug. 13, 2021.
U.S. Appl. No. 16/251,693 Notice of Allowance dated Jul. 23, 2021.
U.S. Appl. No. 16/251,693 Office Action dated Jun. 4, 2021.
U.S. Appl. No. 16/251,693 Office Action dated May 11, 2020.
U.S. Appl. No. 16/251,693 Office Action dated Nov. 30, 2020.
U.S. Appl. No. 16/571,387 Office Action dated Feb. 25, 2020.
U.S. Appl. No. 16/944,364 Notice of Allowance dated Feb. 18, 2021.
U.S. Appl. No. 16/944,364 Notice of Allowance dated Jan. 22, 2021.
U.S. Appl. No. 16/944,364 Notice of Allowance dated Nov. 30, 2020.
U.S. Appl. No. 17/010,287 Notice of Allowance dated Jun. 30, 2021.
U.S. Appl. No. 17/010,287 Notice of Allowance dated May 18, 2021.
U.S. Appl. No. 17/010,287 Notice of Allowance dated May 3, 2021.
U.S. Appl. No. 17/163,680 Notice of Allowance dated Sep. 20, 2021.
U.S. Appl. No. 16/007,069 Notice of Allowance dated Oct. 25, 2019.
U.S. Appl. No. 16/007,069 Office Action dated Jul. 11, 2019.
U.S. Appl. No. 17/163,680 Notice of Allowance dated Nov. 23, 2021.
CN201880033500.1 Office Action dated Jan. 24, 2022 (English Translation).
Co-pending U.S. Appl. No. 17/812,275, inventors Hall; Kevin Christopher et al., filed Jul. 13, 2022.
Co-pending U.S. Appl. No. 17/814,605, inventors Fielding; Alex et al., filed Jul. 25, 2022.
U.S. Appl. No. 16/571,424 Notice of Allowance dated Jan. 14, 2022.
U.S. Appl. No. 17/163,680 Notice of Allowance dated Dec. 22, 2021.
U.S. Appl. No. 17/345,953 Notice of Allowance dated Apr. 13, 2022.

* cited by examiner

INTEGRATED PHYSICAL WAREHOUSE AND DIGITAL DOCUMENT MANAGEMENT SYSTEM

CROSS-REFERENCE

This is a continuation of U.S. patent application Ser. No. 16/251,693, filed Jan. 18, 2019, which claims priority to U.S. application Ser. No. 15/383,292, filed Dec. 19, 2016, which claims the benefit of U.S. Provisional Application No. 62/233,954, filed Dec. 19, 2015, all of which are hereby incorporated by reference in their entireties.

BACKGROUND OF THE INVENTION

Billions of boxes of documents and records of legal or historic importance are stored in massive archives, warehouses and vaults. A standard cardboard banker's box for archival storage is 10×12×15 inches with a capacity of about 2,500 pieces of paper weighing about 25 pounds. There are estimated to be more than 6 billion boxes in commercial storage facilities in the United States. Billions more are stored by public agencies such as government units and archives.

The knowledge and information content represented by these stored records is nearly inaccessible due to extremely high cost of manual processes to locate the specific box in a massive warehouse that may contain tens of millions of similar boxes, transport those boxes to a facility, manually open the box, manually separate the attached groups manually remove the attachments, manually prepare the records for automated copy or scanning machines, perform the scanning function, then manually repackage the box and return the box to a warehouse or direct the contents of a box to a shredding facility.

Those processes rely upon fallible human beings, making them prone to lost or misplaced boxes and therefore lost information. The storage of paper for archival use exposes the contents to potential loss from water, fire and natural processes of decomposition. The reliance upon people in handling sensitive private, legal, financial or government secrets adds concerns for safety and security.

SUMMARY OF THE INVENTION

A need exists to add labels for improved systems and methods for document management. Paper records may be digitized for improved access to document content. High-quality digitized documents may also permit the paper copies to be destroyed, which may reduce the amount of space taken up by physical documents.

Systems and methods are provided for document management. An integrated document management facility may be provided, which may be capable of handling large volumes of paper records. The integrated document facility may digitize the paper records. The document management facility may use automated robotic systems and related apparatus to enable efficient, secure, and accurate operation. The document management facility may be self-contained and may be capable of automated operation without human intervention.

Aspects of the invention may be directed to a document management facility comprising: a document storage section configured to store a plurality of documents within one or more containers; and a document digitization section configured to (1) receive the plurality of documents from the document storage section, (2) prepare individual pages of the plurality of documents for digitization, and (3) digitize the individual pages of the plurality of documents, in an automated fashion without human intervention, wherein the plurality of documents are transferred from the document storage section to the document digitization section in an automated fashion without human intervention.

In some embodiments, the plurality of documents are transferred from the document storage section to the document digitization section with aid of one or more autonomous ground vehicles. The document storage section may include an automated shelving system that manipulates the one or more containers automatically without human intervention. The facility may further comprise a document intake section configured to receive the plurality of documents and collect information relating to the plurality of documents. The plurality of documents may be transferred from the document intake section to the document storage section in an automated fashion without human intervention. The facility may further comprise a document removal section configured to prepare the plurality of documents to be removed from the facility subsequent to the plurality of documents being processed within the document digitization section. The document removal system may shred the documents in an automated fashion without human intervention. The document removal system may be configured to shred the documents in response to an instruction from an operator. A document type may be associated with each of the plurality of documents, and a document retention schedule is applied for each document type. The document retention schedule may be executed in an automatic fashion without human intervention in accordance with a set of rules established by a human operator. The plurality of documents may comprise a plurality of types of media including two or more of the following: paper, card stock, file folders, cardboard, acetate film, polyester film, X-ray film, synthetic paper, microfiche, tissue paper, blueprints, maps, cloth, or parchment.

Additionally, aspects of the invention may be directed to a document digitization section comprising: a document preparation station configured to prepares and separates a plurality of documents from a container; a fastener management station configured to detect and remove fasteners from the plurality of documents; and a document scanning station configured to digitize individual pages of the plurality of documents, wherein the plurality of documents are configured to traverse the document preparation station, the fastener management station, and the document scanning station in an automated fashion without human intervention.

The plurality of documents may be transferred between two or more of the document preparation station, the fastener management station, and the document scanning station with aid of an autonomous ground vehicle. The plurality of documents may comprise a plurality of types of media including two or more of the following: paper, card stock, file folders, cardboard, acetate film, polyester film, X-ray film, synthetic paper, microfiche, tissue paper, blueprints, maps, cloth, or parchment. The document preparation station may be configured to remove the plurality of documents from the container and separate the plurality of documents in an automated fashion without human intervention.

A method of document management may be provided in accordance with further aspects of the invention. The method may comprise: receiving, with aid of a user access terminal, an instruction from a user to control an operation involving one or more documents within a document management facility configured to store and digitize a plurality of documents; and executing, at the document management facility, the operation in accordance with the instruction in an automated fashion without human intervention.

A user access terminal may be at a location remote to the document management facility. In some embodiments, the operation comprises removal of the document from a document storage section of the document management facility, removal of the document from a container, or recognition and removal of a fastener of the document. The method may further comprise receiving, with aid of the user access terminal, a search query for content of a digitized version of the plurality of documents. The method may further comprise executing, with aid of one or more processors, a search of the content and metadata of the digitized version of the plurality of documents.

A cost associated with a digitized version of a paper record may be on par with, or less than, the cost of storing the original paper record. Thanks to technology improvements in digital storage density, storage costs are declining at about 25% year over year. Distributed data backup and redundant systems available for digitized documents provide a significantly higher reliability that a specific document will survive indefinitely than storing physical copies.

The systems and methods provided herein may cumulatively enable the low-cost digitization of paper records of typewritten text. These pages can be reliably converted via optical character recognition to computer searchable text. Powerful search engines and analytic tools can then be applied to extract information that has long sat in exile in a dusty warehouse. Similarly, non-text content can be searched with image analysis tools to extract information. The power of these software-dependent technologies is increasing at a rate faster than Moore's Law.

A digital document management system may be combined with an automated physical warehouse. This may alleviate challenges arising from massive amount of information.

Systems and methods provided herein seek to automate these manual and automated processes into an end-to-end process. One of the benefits is to reduce the cost of making digitized content available to be shared as useful information. A combination of many technologies may be used, that apply physical processes as well as machine methods, to the task.

A large automated process may be provided, such as an automated warehouse with many robotic work cells. More than one robotic work cell would be installed in a large facility designed to handle thousands of boxes a day. The automated warehouse may contribute to process efficiency by providing an inventory queuing system for boxes to be imaged, as well as a storage for boxes that have been scanned but are awaiting quality assurance of the OCR processed pages prior to shredding.

Such an automated facility may be desired for a large archive in which the unscanned backlog of boxes may represent years and years of scanning. Such a facility could enable rapid scanning of selected boxes on demand and returning the box to the archive for permanent archive.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for document management. Various aspects of the invention described herein may be applied to any of the particular applications set forth below. The invention may be applied as a document management facility or may be part of an integrated document digitization system or service. It shall be understood that different aspects of the invention can be appreciated individually, collectively or in combination with each other.

Document management systems and methods may comprise an automated apparatus for manipulation of previously printed paper records in preparation for imaging for digital repositories. This may include separating grouped, attached, stacked, or bound records into individual sheets. Integrated document management facilities, such as warehouses, may be capable of performing the various functions associated with document management in an automated fashion without requiring human intervention. One or more robotic components may assist in allowing the document management facilities to operate in a substantially autonomous fashion without requiring the presence of a human. A large automated warehouse may be provided, which may be capable of processing very large volumes of existing physical documents (e.g., records) for digital imaging. In some embodiments, individuals may control operation of the document management facility from a remote location. Individuals may be on-site to control operation of the document management facility without having to physically manipulate any documents or containers of documents.

The documents may be converted to a digital form. The digital forms may be accessed with aid of a document management system. Individuals may access the document management system directly. In some embodiments, third party document management systems may access the documents and records. The document management system may permit the documents to be managed, searched, and/or analyzed.

Figure 1:
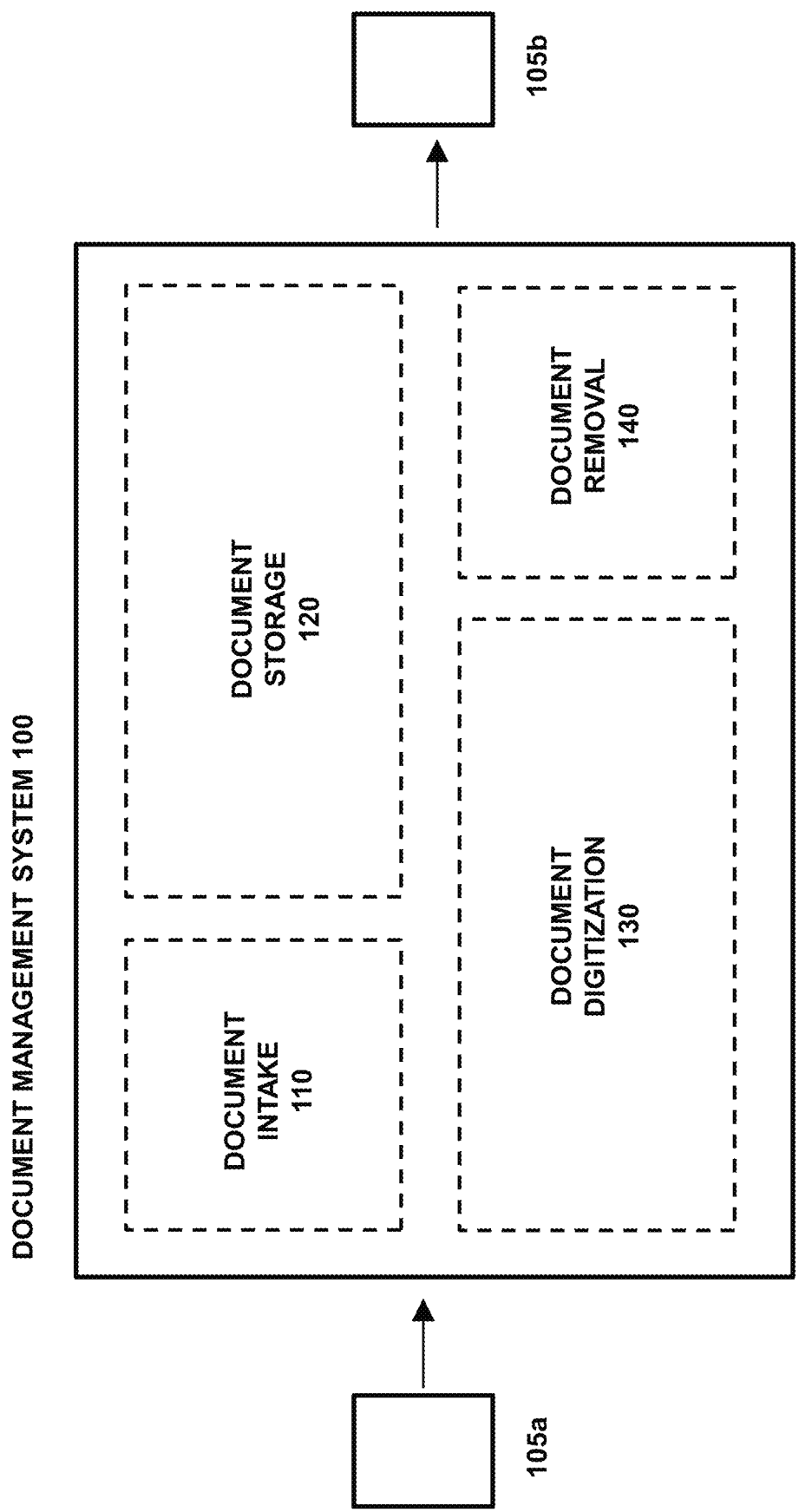
FIG. 1 provides a schematic illustration of a document management facility in accordance with an embodiment of the invention.

FIG. 1 provides a schematic illustration of a document management facility 100 in accordance with an embodiment of the invention. The document management facility may accept physical documents 105a. The document management facility may accommodate removal of physical documents 105b in one form or another. The document management facility may comprise a document intake section 110, document storage section 120, document digitization section 130, and/or a document removal section 140.

A document management facility may include one or more buildings. One or more sections of the facility may be distributed over one or more buildings. A document management facility may be a warehouse. Any description of a warehouse or other type of building may apply to any other type of document management facility. A document management facility may be a factory, or factory-like setting. The document management facility may comprise one or more large facilities or campus. The document management facility may comprise a ceiling and one, two, three, four, or more walls. The document management facilities may include one or more openings. The one or more openings may be sufficiently large to accept one or more containers of documents. The one or more openings may be sufficiently large to accept one or more pallets with a plurality of containers loaded thereon. The one or more openings may be sufficiently large to receive a portion of a truck that may be used to deliver and/or receive documents. The document management facilities may include one or more loading and/or unloading areas.

One or more physical documents 105a may be provided to a document management facility. The physical documents may be delivered to the document management facility within one or more containers. For example, the containers may include boxes, crates, drums, barrels, storage containers, or any other type of container. In some examples the containers may be banker's boxes. The containers may all be of the same type or may be of different types. The containers may have the same or similar dimensions, or may have different dimensions from one another. The containers may have the same shape or may have different shapes from one another.

The one or more physical documents may be provided within one or more containers. The physical documents may be arranged in one or more stacks within the containers. The physical documents may be provided in vertical stacks and/or horizontal stacks. The physical documents may be loosely stacked within the containers. The physical documents may be provided within one or more organizers, such as file folders (e.g., manila folders, redwells, accordion folders, pocket folders), envelopes, binders, pouches, or in any other organizational forms.

The one or more physical documents may be of any media type. The one or more physical documents within each container may be of the same media type or may include multiple media types. Examples of media types include, but are not limited to, paper, card stock, file folders, cardboard, acetate film, polyester film, X-ray film, synthetic paper, microfiche, tissue paper, blueprints, maps, cloth, or parchment. The physical documents may include sheets, business cards, envelopes, cards, or folded documents. The physical documents may also include post-its, tabs, stickers, labels, post cards, or any other item that may be part of or added onto an existing physical document. In some embodiments, one or more, two or more, three or more, four or more, five or more, six or more, seven or more, or eight or more different media types may be provided to the document management facility. The documents may have the same size or may have different sizes. The documents may have the same shapes or may have different shapes. The documents may have the same alignment or orientation (e.g., landscape/portrait) or different alignments and/or orientations.

The one or more physical documents may be grouped with aid of fasteners. Examples of fasteners may include, but are not limited to, staples (e.g., ferrous metal staples, plastic staples, non-ferrous metal staples), paper clips, spring binder clips, clamps, two-prong metal pot fasteners, rings, spiral rings, brads, rubber bands, rivets, grommets, pins, ties, snaps, velcro, adhesives, tapes, or any other types of fasteners.

The document management facility may comprise one or more sections that may be used during the processing of the physical documents. Any description of various types of sections may apply to a function of the document management facility. The sections may or may not be provided at different locations within the facility. Such locations may be within the same building or distributed over multiple buildings. In some embodiments, each section may have its own region. For instance, a document storage region may be at a separate location from a document digitization region. Alternatively, two or more of the sections may share physical regions. For instance, the document storage section and the document digitization section may be at substantially the same location.

Documents may traverse the various sections of the facility. The documents may traverse the various sections of the facility in an automated manner. The documents may traverse the sections of the facility with aid of one or more robotic apparatus. For example, the documents may traverse the sections of the facility with aid of autonomous ground vehicles, autonomous aerial vehicles, conveyer belts, cranes, gantries, robotic arms, suction apparatus, pneumatic mechanisms, hydraulic mechanisms, and/or magnetic mechanisms. The documents may traverse the sections of the facility with aid of one or more transport vehicles. The documents may traverse the sections of the facility without requiring direct manual intervention by humans. The documents may traverse the sections of the facility without humans directly contacting the documents and/or the containers holding the documents. Alternatively, humans may aid in the transport of the documents and/or containers.

Similarly, documents may travel within the various sections of the facility in an automated manner. The documents may be processed within the various sections of the facility in an automated manner. The documents may traverse and/or be processed within the various sections of the facility with aid of one or more robotic apparatus, such as those described previously herein. The documents may traverse and/or be processed within the various sections of the facility without requiring direct manual intervention by humans. The documents may traverse and/or be processed within the various sections without humans directly contacting the documents and/or containers holding the documents. Alternatively, humans may intervene or come into contact with the document and/or containers at one or more of the sections.

The document management facility may include a document intake section 110. A document intake section may receive the one or more physical documents 105*a*. The documents may be in one or more containers when received. The document intake section may cause the one or more containers to be unloaded, information about the containers and/or documents to be collected, and the documents to be transferred to a document storage section.

The document management facility may also include a document storage section 120. The document storage section may be a separate section from the document intake section or may be incorporated with the document intake section. The document storage section may be at a different location from the document intake section or may be at the same location as the document intake section. The sections may or may not overlap in physical area. The document storage section may receive the one or more physical documents after the one or more physical documents have gone through the document intake section. The document intake section may be optional. In alternative embodiments, the document storage section may directly receive the documents from a delivery.

The document storage section may store physical documents prior to, and/or subsequent to, digitization of the documents. In some embodiments, documents that have not yet been digitized may be stored in at a different location from documents that have already been digitized. Alternatively, the locations may be incorporated together. The documents may be stored within containers. The documents may be stored in the same containers in which they originally arrived. Alternatively, they may be repacked and stored in different containers from which they originally arrived. In some embodiments, the documents may be stored in the same containers prior to and subsequent to digitization. Alternatively, the documents may be stored in different containers prior to and subsequent to digitization. In some embodiments, some documents may be removed or destroyed subsequent to digitization and need not be stored.

The documents may be stored in the document storage section within the containers or without the containers. The storage section may serve as a buffer process while the documents await the next step. In some embodiments, the storage section may serve as a short-term storage before the next steps for the documents are ready. The storage section may serve as a long-term storage for the documents until they are removed.

The document management facility may include a document digitization section 130. The document digitization section may be a separate section from the document intake section and/or document storage section or may be incorporated with the document intake section and/or document storage section. The document digitization section may be at a different location from the document intake section and/or document storage section or may be at the same location as the document intake section and/or document storage section.

The document digitization section may create digital versions of the physical documents. The document digitization section may be able to create digital versions of flexible media types. For instance, the document digitization section may accommodate documents that may include different media types, or have different dimensions, shapes, and/or alignments, without requiring human intervention. The document digitization section may include a document preparation station, a fastener management station, and/or a document scanning station. The various stations may be at separate locations or may be at the same location. The various stations may each perform separate functions, or may be incorporated together to perform the functions.

A document preparation station may remove documents from one or more containers if any. The document preparation may optionally separate the various documents from one another. The document preparation station may optionally create one or more stacks of documents, or put the documents into a desired configuration.

One or more sheets of a document may be connected with aid of one or more fastener. A fastener management system may image a fastener. The fastener management system may recognize and remove fasteners from the documents. The one or more documents may then be formed of one or more loose sheets without requiring fasteners.

A document scanning station may create digital versions of the documents. The documents may be imaged to create the digital versions. The digital versions of the documents may be stored in a memory. The memory may include one or more local memory storage units at the document management facility. Alternatively or in addition, the memory may include one or more memory storage units that are remote to the document management facility. The memory may have a cloud computing infrastructure. For instance, the digital versions of the documents may be stored at a cloud storage. Digital versions of the documents may be distributed over a peer to peer network. The digital versions of the records may be accessed by individuals. The digital versions of the records may be accessed by a records management system. Further description of records management is provided in greater detail elsewhere herein.

Documents may traverse the various stations. The documents may traverse the various stations of the document digitization section in an automated manner. The documents may traverse the stations of the document digitization section with aid of one or more robotic apparatus, such as those described previously herein. The documents may traverse the stations of the document digitization section without requiring direct manual intervention by humans. The documents may traverse the stations without humans directly contacting the documents and/or the containers holding the documents.

Similarly, documents may travel within the various stations of the document digitization section in an automated manner. The documents may be processed within the various stations of the document digitization section in an automated manner. The documents may traverse and/or be processed within the various stations with aid of one or more robotic apparatus, such as those described previously herein. The documents may traverse and/or be processed within the various stations of the document digitization section without requiring direct manual intervention by humans. The documents may traverse and/or be processed within the various stations without humans directly contacting the documents and/or containers holding the documents.

The document management facility may include a document removal section 140. The document removal section may be a separate section from the document intake section, document storage section, and/or the document digitization section or may be incorporated with the document intake section, document storage section, and/or the document digitization section. The document removal section may be at a different location from the document intake section, document storage section, and/or the document digitization section or may be at the same location as the document intake section, document storage section, and/or the document digitization section.

The document removal section may be used when the physical documents no longer need to be stored. The document removal section may prepare the physical documents to be removed from the document management facility. The document removal section may convert the documents to a waste form. For example, the document removal section may include a shredding station that may shred the documents. The document removal section may optionally burn the documents. The document removal section may convert the documents into an illegible format. The document removal section may convert the documents into a form that takes less physical space. The document removal station may convert the documents into a format that may be acceptable by a recycling center, composting facility, or landfill.

The documents that leave the facility 105b may be intact or may be in a waste form. When documents are leaving the facility in an intact form, they may be packaged in the same way as they originally arrived at the facility. For example, the document may be in the same organizers and/or containers in which they originally arrived. The documents may have fasteners in the same manner with which they originally arrived. Alternatively, the documents may be packaged differently from how they originally arrived. For example, the documents may be in different organizers and/or containers from which they originally arrived, or may not be in organizers at all. The documents may be loose (unfastened) and/or fastened in a different manner from which they originally arrived.

When the documents are leaving the facility in a waste form, the waste form may optionally not be legible. The documents may be departing the facility in a shredded form. The documents may be departing the facility in ashes, or any other form. The documents may be in a form that may allow the documents to be recycled and/or composted.

The document management facility may be capable of operating completely without human intervention. One or more of the sections of the document management facility may be capable of operating completely without human intervention. Robotic apparatus or automated machinery may be installed at the document management facility to perform operations relating to the documents. For instance, the robotic system and automated apparatus may prepare for processing of various types of documents, such as those described previously, which may include singulated items and/or fastened (e.g., grouped, attached, stacked, bound) pages, for the purposes of imaging them as individual separated sheets of pages. The document management facility may be integrated with an automated warehouse to store an inventory of many boxes of records in anticipation of digital imaging. For instance, the number of boxes may be on the order of single boxes, tens of boxes, hundreds of boxes, thousands of boxes, tens of thousands of boxes, hundreds of thousands of boxes, millions of boxes, or more.

Figure 2:
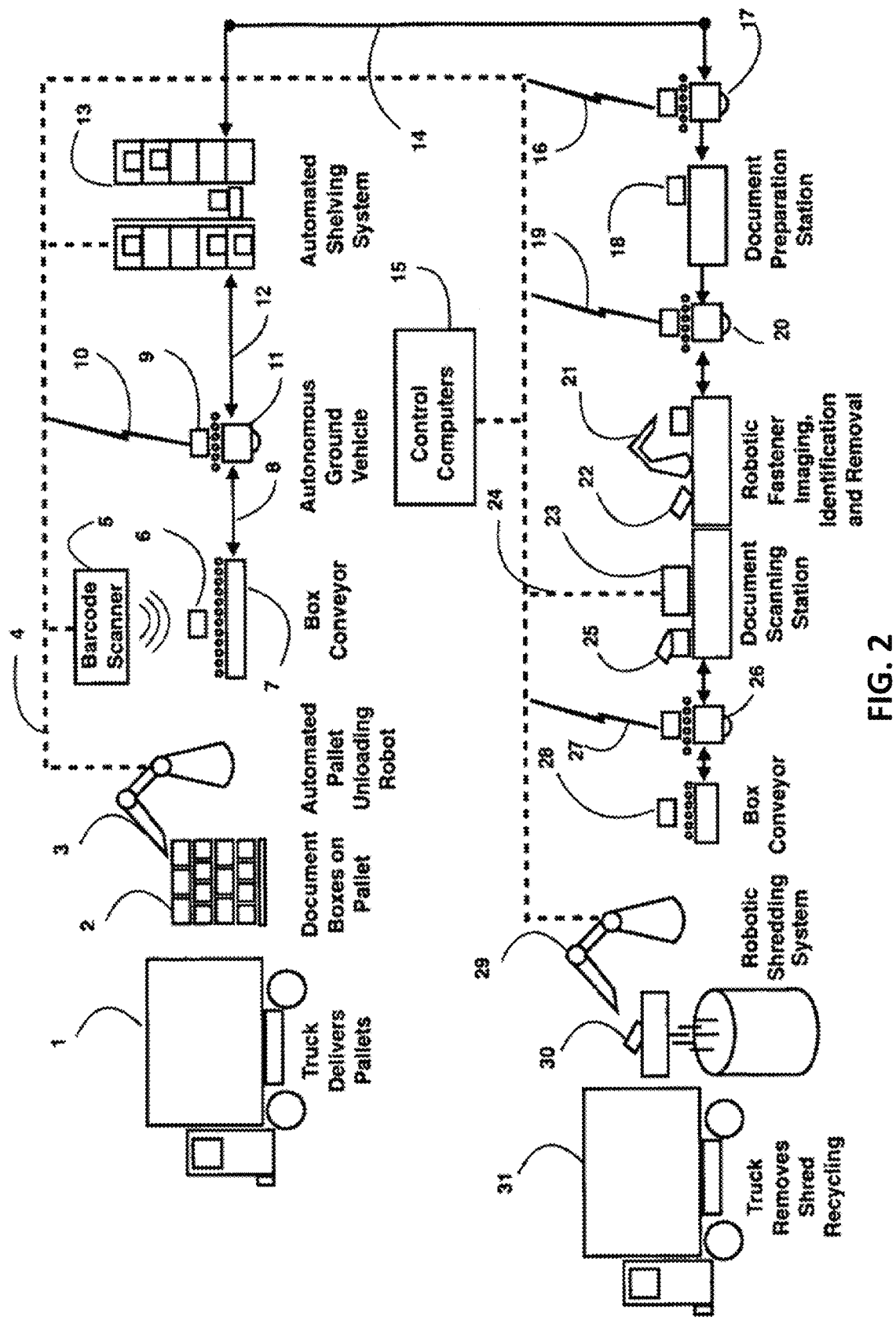
FIG. 2 is a functional diagram of exemplary components of an integrated physical warehouse for automated scanning of document in accordance with an embodiment of the invention.

FIG. 2 is a functional diagram of exemplary components of an integrated physical warehouse for automated scanning of document in accordance with an embodiment of the invention. The warehouse may have any features of the document management facility as described elsewhere, or vice versa. The warehouse may permit a highly automated conversion of massive quantities of documents into digitally scanned records. The use of a warehouse that may employ automated systems may reduce or eliminate human error, improve security for sensitive documents, and provide reliable control.

The warehouse may comprise one or more control computers 15. Any description herein of a control computer may include one or more devices that are locally provided at the warehouse, and/or devices that may be provided remotely from the warehouse. In some instances, one or more control computers may be at any location, such as those distributed inside and/or outside the warehouse. Any description herein of a control computer may include devices that may serve as a user access terminal from a human. Devices may include, but are not limited to personal computers (e.g., laptop or desktop PC), servers, or mobile devices (e.g., mobile phones, smartphones, tablets, or personal digital assistants), or any device capable of forming a network connection.

The control computers may be connected to one or more other apparatuses within the warehouse. Examples of one or more other apparatuses may include, but are not limited to machines, robots, vehicles (e.g., autonomous ground vehicles, autonomous aerial vehicles). The one or more apparatuses may aid in document intake, storage, digitization, and/or removal. Any apparatus described elsewhere herein that may be used at the document facility process may be in communication with one or more control computers. The control computers may be connected via wired 4 and/or wireless connections 10, 16, 19, 27. Any illustration herein of a wired connection may also be implemented as a wireless connection and vice versa. In some embodiments, the control computers may have a wireless connection with an autonomous ground vehicle, or any other apparatus that may move within an environment. The control computers may have a wired connection with apparatus that is substantially stationary. The communication connections may allow one-way or two-way communication between the control computers and the apparatuses.

The one or more control computers may be accessible from a remote location or may be provided at a remote location. Communication with one or more apparatuses of the warehouse may occur through the one or more computers with users who are located at the warehouse, or users or are located remotely from the warehouse. The users may communicate with the control computers over a network. The users may communicate with the one or more apparatuses over a network. The user may view information about the operation of the one or more apparatuses. The users may provide an instruction that may affect the operation of the one or more apparatuses. The users may provide a set of rules or parameters that may affect the operation of the one or more apparatuses. The users may provide a direct command to directly control the operation of the one or more apparatuses. The user may provide a command that may initiate one or more actions by the one or more apparatuses that may be autonomous, semi-autonomous, or directly manually controlled. The user may be able to select one or more individual apparatuses for which the user wishes to view information and/or provide instructions.

Documents may be delivered to the warehouse. A delivery vehicle 1 may deliver documents to the warehouse. Any type of delivery vehicle may be used. The delivery vehicle may be a truck, van, bus, car, train, monorail, helicopter, airplane, or motorcycle. The delivery vehicle may be capable of carrying one or more containers of documents.

The delivery vehicle may deliver documents 2 in a loose format or within one or more containers. The containers may be any type of containers described elsewhere herein, such as boxes. For example, the documents may be stored and/or delivered in bankers boxes. The documents may be stored and/or delivered in boxes of about 12 inches wide, by 15 inches long, by 10 inches high. In some embodiments, the containers may be provided on one or more pallets or other support structures. For examples, boxes may be stacked on top of pallets. The containers may be on the pallets within the delivery vehicle. The pallets may be removed from the delivery vehicle with containers thereon. The pallets may be removed manually or with aid of one or more automated apparatuses.

The documents may be removed from vehicle and/or the pallets. The documents may be within containers which may be removed from the vehicle and/or pallet. The documents may be removed with aid of an unloading robot 3. For example, an automated pallet unloading robot may separate containers (e.g., boxes) from the pallet and place one or more container 6 at a document intake and review station. The unloading robot may include one or more robotic arm. The unloading robot may include one or more grippers or other stabilization apparatuses that may allow the unloading robot to gasp the containers and/or prevent the containers from slipping. The unloading robot may handle a single container at a time. Alternatively, the unloading robot may handle multiple containers at a time. The unloading robot may have a fixed location. Alternatively, the unloading robot may move from location to location. In some instances, the unloading robot may move from location to location in an autonomous fashion.

A control computer may be in communication with the unloading robot. Alternatively or in addition, the unloading robot may be able to operate autonomously without communicating with the control computer. The unloading robot may have one or more sensors that may allow the unloading robot to detect the containers or portions of containers. One or more sensors of the unloading robot may allow the robot to collect information that may allow the robot to operate autonomously or semi-autonomously.

The document intake and review station may include an apparatus that may read one or more identifier on the document and/or container. For example, a barcode scanner 5 may be provided that may read one or more bar codes on the document and/or container. For example, boxes may commonly be labeled with bar codes. Any description herein of a barcode may apply to a 1D barcode, 2D barcode, and/or 3D barcode. Any description of a barcode may apply to any other type of visual identifier that may uniquely identify the box or include information about the box. Any description herein of a barcode scanner may apply to any other type of apparatus that may read one or more identifier of the document and/or container. For example, a camera may be employed to capture an image of the document and/or container. Optical character recognition (OCR) techniques may be utilized for capturing information about the specific box contents. For instance, the box may include a label, an image of which may be captured using a camera. OCR techniques may be used to collect the information from the image of the label. In another example, the box may have a RFID chip or other marker. An RFID reader or other type of reader may detect and read the RFID chip or other marker. In another example, the box may have an ultraviolet (UV) or infrared (IR) marker that may be read by a corresponding scanner that may detect the label. Any description herein of a container may also apply to a document within a container or a loose set of documents.

The control computer may be in communication with the barcode scanner. Data read by the barcode scanner may be provided to the control computer. The control computer may store the data about the container and/or documents provided by the barcode scanner. The control computer may issue instructions for handling of the documents and/or container. The instructions may include a destination for the container and/or documents to be stored. The instructions may or may not include details on how to transport the container and/or documents to the destination. The instructions may be generated with aid of one or more processors based on the information read by the barcode scanner.

The document intake and review station may include an apparatus that may handle and/or support the document and/or containers. For instance, the one or more containers may be provided by the unloading robot to a box conveyer 7. The box conveyer may be conveyer belt or any other type of apparatus that may move and/or support the container. The conveyer may support the container while the container is read and/or identified. The container may be stationary and/or moving while the container is read/identified. The container may be moved substantially laterally. The conveyer may pause to allow the container to remain stationary while being read, and then move to allow the container to move after being read. Alternatively, the conveyer may be continuously moving, and the container may be moving while it is read.

The control computer may determine a destination for the container 6. The control computer may determine the destination based on information read by the barcode scanner. The box conveyer 7 may optionally direct the container to a storage section. The box conveyer may optionally direct the container to an area within the storage section that is near the destination. The box conveyer may optionally direct and deliver the container to the destination.

Alternatively, one or more transport vehicles 11 may aid in the delivery of the container to the destination. In some instances, the transport vehicle may deliver the container to a storage section. The transport vehicle may deliver the container to an area of the storage section that is near the destination. The transport vehicle may optionally directly deliver the container to the destination. The transport vehicle may be provided in addition to or as an alternative to the box conveyer. In one example, the unloading robot may directly provide the container to a transport vehicle. A barcode scanner or other identifying device may identify the container and/or documents while the transport vehicle is carrying the container and/or documents.

A transport vehicle may receive the container and/or documents from the box conveyer. The transport vehicle 11 may receive a container 9. The container may be carried on top of the transport vehicle. The container may be carried within the vehicle. In some instances, the transport vehicle may have a conveyer belt or other type of lateral movement device that may receive the container from the box conveyer. The box may rest on top of a conveyer belt of the transport vehicle. The conveyer belt may stop motion when the container is at a desired position on the transport vehicle. Robotic arms and/or grippers may be used in addition or as an alternative to receive the container.

The transport vehicle may travel 8 to the box conveyer. The transport vehicle may travel back and forth between the box conveyer and a storage section via a path 12. The path may be the same every time the transport vehicle travels.

Alternatively, the path may vary. In some instances, the path may be generated in real-time while the transport vehicle operates in an autonomous fashion.

The transport vehicle may be an autonomous ground vehicle. Alternatively, the transport vehicle may be an autonomous aerial vehicle, or any other type of apparatus as described elsewhere herein. The transport vehicle may be capable of traveling between a document intake and document storage section in an autonomous fashion. The transport vehicle may move freely along two axes of movement and/or three axes of movement. The transport vehicle may move freely over a surface or in the air. The transport vehicle may or may not be constrained in movement. In some instances, the transport vehicle may move along a pre-set track. The transport vehicle may move along one or more pre-set path options. Alternatively, the transport vehicle may freely move in an autonomous fashion. The transport vehicle may comprise one or more sensors that may aid in its ability to travel autonomously. The sensors may allow the transport vehicle to detect an object and avoid a collision. The transport vehicle may optionally include one or more wheels that may allow the transport vehicle to traverse a surface.

The transport vehicle may communicate with a control computer via a communication link 10. In some embodiments, the communication link may be a wireless communication link. Instructions may be provided via the communication link for the transport vehicle to move. The instructions may directly control how the transport vehicle moves, or may initiate the transport vehicle to move autonomously on its own. In some embodiments, the communication link may be useful for tracking a location of an identified container.

The transport vehicle may transport a container to a document storage section. The document storage section may comprise an automated shelving system 13. A location of each container within the automated shelving system may be known. The control computer may track the location of each container within the automated shelving system. An identifier of the container may be associated with a particular location within the automated shelving system.

An automated shelving system may comprise one or more locations within which containers (and/or loose documents) may be stored. The automated shelving system may include one or more storage locations that may be vertically arranged on top of one another. The automated shelving system may include one or more storage locations that may be laterally arranged next to one another. The storage locations may have the same dimensions or different dimensions. In some instances, the storage locations may have a height that may accommodate a standard storage box. Optionally, the storage locations may have a width and/or depth that may accommodate a standard storage box. The automated shelving station may include shelves extending laterally that may support the one or more containers. The automated shelving station may or may not include one or more vertical dividers that may separate containers that are arranged next to each other.

The automated shelving system may be substantially static. Alternatively, the automated shelving system may include one or more movable portion. In some instances, the shelves may move laterally and/or vertically. The shelves may slide from side to side and/or front to back. This may allow the containers to be transferred from the transport vehicle to the location within the automated shelving system. In other instances, one or more dividers may move laterally. This may allow different sized containers to be accommodated.

In some instances, the transport vehicles may be capable of directly delivering the container to a location within the automated shelving system. In some instances, a transfer device may receive the container from the transport vehicle and deliver the container to the appropriate location within the automated shelving system. The transfer device may be capable of moving the container vertically and/or horizontally. The transfer device may be capable of propelling the container into a location within the shelving system. The automated shelving system may manipulate the container automatically without human intervention. The automated shelving system may allow the containers to move laterally and/or vertically. The automated shelving system may include one or more actuators that permit portions of the automated shelving system to move (e.g., divider, elevator, shelves, conveyer). A transfer device may be part of the automated shelving system or may be separate from the automated shelving system.

The storage section may comprise one or more bays that may receive one or more containers and serve as a location within which the containers may be stored. The bays may be movable relative to one another. The bays may be capable of moving vertically and/or laterally. The location of the bays may be tracked as well as identification of containers within the corresponding bays.

A container may be stored in a buffer process awaiting the next step. The storage section may serve as a buffer to store the containers upon receiving them at the warehouse and prior to digitization of the associated documents. For example, if there is a rapid influx of documents to the warehouse, the warehouse may be capable of digitizing documents at a limited rate, and the extra documents may remain in storage until they are ready to be digitized. In some instances, the storage section may only store documents prior to digitization. Alternatively, one or more sets of documents may be stored after digitization as well. In some instances, the storage section may serve as a buffer to store the containers after digitization and prior to removal of the documents from the warehouse.

In some embodiments, different areas of the storage section may be devoted to storage prior to and after digitization. Alternatively, the locations of the various containers at different stages in the process may all be mixed together.

The storage system may be in communication with a control computer. The storage system may be in communication with the control computer via a wired connection. The control computer may or may not directly control movement of one or more component of the storage section. The control computer may receive information about a location of a container within the storage section.

A transport vehicle 17 may deliver a container from a storage section to a document digitization section. The transport vehicle may traverse a travel path 14 between the document storage section and the document digitization section. The travel path may be fixed or may be variable. The travel path may be the same every time or may be different. The travel path may be determined in real-time while the transport vehicle is in motion.

The transport vehicle may be the same type of transport vehicle 11 that may move the container from the document intake section to the storage section. The transport vehicle 17 may have one or more characteristics that may be the same as the transport vehicle 11. The transport vehicle 17 may optionally be the same transport vehicle 11 that delivers the container to the storage section. The transport vehicle 16 may optionally be in wireless communication 16 with the control computer. The control computer may direct the transport vehicle to take the travel path 14 to the document digitization section.

The transport vehicle may transport a container to a document preparation station 18. The document preparation station may prepare and separate document contents of a container. The transport vehicle may deliver the container to the document preparation station autonomously without requiring human intervention. The document preparation station may remove one or more documents from a container. The document preparation station may remove an individual set of documents at a time, or may remove all the documents from the container at a time. The document preparation station may utilize one or more pneumatic (e.g., vacuums) to remove documents from the container. The document preparation station may utilize one or more robotic arms to remove the documents from the container. The robotic arms may include grippers or other features that may allow the robotic arms to grasp and/or remove the documents. The documents may be removed from the container and presented as a stack. Alternatively, individual documents may be individually arranged. The documents may or may not be separated from one another. The documents may be arranged in a desired manner. For instance, they may be oriented so that they are directed in the same direction. The documents may be arranged so that one or more edges of the pages are substantially parallel to one another. The documents may be of the same type or different types. The documents may be made from the same material or different materials. The documents may have the same dimensions or different dimensions.

If there are any folders or other types of dividers for the documents, the documents may be removed from the folders and/or dividers. Information about the location and/or presence of the folders and/or dividers may be stored and/or tracked. Alternatively, the documents may remain in the folders and/or dividers.

A transport vehicle 20 may deliver a container and/or documents from a document preparation station 18 to a robotic fastener imaging, identification, and removal station 21. The transport vehicle may traverse a travel path between the document preparation station and the robotic fastener imaging, identification, and removal station. The travel path may be fixed or may be variable. The travel path may be the same every time or may be different. The travel path may be determined in real-time while the transport vehicle is in motion.

The transport vehicle 20 may be the same type of transport vehicle 11, 17 that may move the container and/or documents from the document intake section to the storage section, or from the storage section to the document digitization section. The transport vehicle 20 may have one or more characteristics that may be the same as the transport vehicle 11, 17. The transport vehicle 20 may optionally be the same transport vehicle 11 that delivers the container to the storage section or the transport vehicle 17 that delivers the container to the document digitization section. The transport vehicle 20 may optionally be in wireless communication 19 with the control computer. The control computer may direct the transport vehicle to take the travel path to the robotic fastener imaging, identification, and removal station.

A container and/or documents may be autonomously provided from the document preparation station to the robotic fastener imaging, identification, and removal station. In some embodiments, the container may be removed at the document preparation station, and only one or more documents from within the container may be presented to the robotic fastener imaging, identification, and removal station. In some instances, individual documents may be presented to the robotic fastener imaging, identification, and removal station. For example, a single document may be presented to the station at a time. Alternatively, batches or multiple documents may be presented to the station at a time. The batches of documents may be an entirety or a subset of the documents provided within the container.

The documents may be formed of one or more pages. In some instances, one or more pages of the documents may be attached together with aid of a fastener. Examples of fasteners may include staples (e.g., ferrous metal staples, plastic staples, non-ferrous metal staples), paper clips, spring binder clips, clamps, two-prong metal pot fasteners, rings, spiral rings, brads, rubber bands, rivets, grommets, pins, ties, snaps, velcro, adhesives, tapes, or any other types of fasteners.

The robotic fastener, identification, and removal station may image the document. The document may be imaged with aid of one or more cameras. The document may be imaged to identify a fastener of the document. The fastener may be identified with aid of one or more OCR techniques. Software may be utilized to automatically identify the fastener. Alternatively, a human agent may view the images collected by the camera and identify the fastener. In some embodiments, one or more light sources may be used to illuminate the document. The light from the one or more light sources may be useful in imaging and/or identifying the fasteners. In some embodiments, imaging the document may also be useful for collecting additional information about the document, such as text/image orientation, page dimensions, layout, texture, and so forth. Such parameters may be useful in determining how to handle the document at the robotic fastener, identification, and removal station, or any subsequent stations, such as a document scanning station.

The fasteners may be identified at the robotic fastener imaging, identification, and removal station. The station may be able to determine how to remove the fastener. The fastener removal technique may be determined based on an identified type of fastener. For example, a first removal technique may be employed to remove a first type of fastener, while a second removal technique different from the first removal technique may be employed to remove a second type of fastener.

A location of the fastener on the document may be identified at the robotic fastener imaging, identification, and removal station. The location of the fastener may be useful for determining how the station will remove the fastener. The station may be able to remove the fastener while providing little or no damage to the document. The station may permit the fastener to be removed in an automated system. The station may permit the identification and/or removal of the fastener without requiring any human intervention.

In some embodiments, the robotic fastener, identification, and removal station may remove a fastener with aid of one or more robotic arms. Optionally, devices such as magnets, pneumatic devices, grippers, hooks, feet, or clamps may be employed to remove the fastener.

When a fastener has been removed, the document may comprise the one or more individual pages that may be free and/or separated from one another. The individual pages may be a singulated document 22. The individual pages, unattached to other pages, may be passed to a document scanning station 23.

The pages may be transferred directly from the robotic fastener imaging, identification, and removal station to the document scanning station. The pages may be transferred with aid of a conveyer belt or similar type of conveyance mechanism. Transport vehicles may or may not be utilized to transfer the pages to the document scanning station. The pages may be transferred from the robotic fastener imaging, identification, and removal station to the document scanning stationary automatically, without requiring human intervention.

The document scanning station may create a digital version of the one or more pages. The pages may be single sided or double sided. The document scanning station may be capable of scanning single sided and/or double sided documents. In some embodiments, the document scanning station may detect whether the pages are single or double sided. Alternatively, the robotic fastener imaging, identification, and removal station may be capable of detecting whether the document is single or double sided, and may share the information with the document scanning station. The same may apply for any type of parameters of the document, such as orientation, dimension, texture, and so forth. The document scanning station may directly detect the parameters or the robotic fastener imaging, identification, and removal station may detect the parameters and share the information. Such parameters may be detected with aid of one or more sensors and/or one or more processors. Data from one or more sensors may be transferred to one or processors at the document scanning station or remote to the document scanning station. The one or more processors may generate an instruction to affect a scanning action of the document scanning station (e.g., light settings, speed, sides, scanning mode, colors, etc.).

In some embodiments, the document scanning station may scan a single side of the individual pages of the document at a time. Alternatively, the document scanning station may scan both sides of the individual pages of the document simultaneously or substantially simultaneously. A first side of a page may be scanned prior to or subsequent to a start or completion of scanning a second page. A first side of a page may be scanned while a second side of the page may be scanned.

The digital version of the pages may be of high quality. The digital version of the pages may have at least a 1 micron, 2 micron, 3 micron, 4 micron 5 micron, 7 micron, 10 micron, 15 micron, 20 micron, 30 micron, 50 micron, or 100 micron resolution. The digital versions may be at least at 1 MP, 2 MP, 3 MP, 4 MP, 5 MP, 6 MP, 7 MP, 8 MP, 9 MP, 10 MP, 12 MP, 15 MP, or 20 MP. The digital version may be within a range between any of the values provided herein. The digital version of the pages may be true to the color of the pages. The digital version of the pages may be created with aid of one or more imaging devices. An image of an entire page may be captured simultaneously. Alternatively or in addition, the image of the entire page may be scanned.

The document scanning station may be capable of receiving the individual pages and creating the digital versions automatically. The individual pages belonging to a single document may be associated with one another. The document scanning station may be able to determine which pages originally belonged to the same document, and the digital version may make note of such association. For instance, the user may be able to view multiple pages belonging to the same document together. The digital versions may be stored on a document by document basis. The document scanning station may be capable of receiving the physical singulated documents and creating the digital versions without human intervention.

A communication link may be provided between the one or more control computers and the document scanning station. The digital versions of the document may be transmitted from the document scanning station to the one or more control computers. The digital versions of the document may be sent and stored in one or more memory storage devices. A resulting scanned document electronic file 24 may be sent over a network 4 for storage. The electronic file may be accessible from one or more control computers. The electronic file may be accessible by one or more computing devices at the warehouse or remote to the warehouse.

The completed scanned physical documents 25 may be aggregated into a group. The individual pages belonging to the same document may or may not be re-fastened together. In some instances, the individual pages may remain loose. Alternatively, a robotic apparatus may re-fasten the pages. The pages may be re-fastened in an autonomous manner. The pages may be re-fastened without requiring human intervention. The pages may or may not be re-fastened using the same type of fastener as originally fastened. The pages may be re-fastened in the same order. The re-fastened document may be substantially identical to the document prior to entering the document digitization section. The completed scanned physical documents may or may not be put into a container. In some embodiments, the container may be the same container in which they arrived at a document digitization section. For example, a set of documents may arrive at a document digitization section in a box. After the documents have been digitized, the physical version may be put into the same box, a different box, or no box.

The container and/or documents may be conveyed to a box conveyer 28. They may be conveyed directly to the box conveyer or may be conveyed with aid of one or more transport vehicles 26. The transport vehicle may traverse a travel path between the document preparation station and the robotic fastener imaging, identification, and removal station. The travel path may be fixed or may be variable. The travel path may be the same every time or may be different. The travel path may be determined in real-time while the transport vehicle is in motion.

The transport vehicle 26 may be the same type of transport vehicle 11, 17, 20 as any of those previously described. The transport vehicle 26 may have one or more characteristics that may be the same as any of the transport vehicles previously described 11, 17, 20. The transport vehicle 26 may optionally be the same transport vehicle as any of those previously described 11, 17, 20. The transport vehicle 26 may optionally be in wireless communication 27 with the control computer. The control computer may direct the transport vehicle to take the travel path to the box conveyer.

The box conveyer 28 may have any characteristics or traits of a box conveyer as previously described 7. The box conveyer may be conveyer belt or any other type of apparatus that may move and/or support the container. The conveyer may support the container while the container is read and/or identified. The box conveyer may optionally direct the container to a document removal section or within the document removal section.

Alternatively or in addition, the one or more transport vehicles 26 may aid in the delivery of the container to the document removal section.

The box conveyer 28 may receive the container and/or documents from the transport vehicle. The container may be carried on top of the transport vehicle. The container may be carried within the vehicle. In some instances, the transport vehicle may have a conveyer belt or other type of lateral movement device that may receive the container from the document scanning station and/or provide the container to the box conveyer. The container may rest on top of a conveyer belt of the transport vehicle. The conveyer belt may stop motion when the container is at a desired position on the transport vehicle. Robotic arms and/or grippers may be used in addition or as an alternative to receive the container.

The box conveyer may convey the container to an apparatus that may convert the container and/or documents into a waste form. For example, the box conveyer may convey the container to a robotic shredding system 29. Any description herein of a robotic shredding system may apply to any type of system that may convert the documents into a waste form. The documents may be converted into a form that is not legible. The documents may be shredded, cut, burned, treated with chemicals, or undergo any other type of process.

As previously described, the documents may be provided from the document digitization section directly to the document removal section. The documents may be provided in an automated fashion without requiring human intervention. Alternatively or in addition, documents may be transferred from a document storage section to a document removal section. In some embodiments, after documents have been digitized, they may be returned back to a document storage section. In some instances, one or more processors, such as one or more processors at the document digitization section, document storage section, and/or one or more control computers, may make a determination as to how to direct the documents. For instance, the one or more processors may determine whether the document removal section has the capacity to receive documents and/or convert them to waste form. If so, they may take the documents directly from the document digitization section. If the document removal system does not have capacity, they make the determination to transfer them to the document storage section until there is capacity. Similarly, the one or more processors may determine whether a document digitization system has capacity to digitize one or more documents. If so, documents may be transferred directly from a document intake system to a document digitization section. If there is not sufficient capacity, they may be transferred to the document storage section until capacity opens up at the document digitization section.

The documents may be transferred between the various sections in an automated fashion. In some instances, they may be transferred with aid of one or more transport vehicles, which may be capable of moving in an autonomous or semi-autonomous fashion.

In some instances, the shredding system may receive the entire container with one or more documents therein. Alternatively, the shredding system may receive one or more loose documents. One or more pages of the documents may be fastened together or may be singulated and/or separated. The completed documents 30 may be fed into a shredder. The document shredding system may comprise a robotic apparatus that may receive the documents and feed them into the shredder. The robotic apparatus may comprise one or more robotic arms. The robotic apparatus may comprise one or more grippers or other types of effectors. The robotic apparatus may grasp one or more documents. The robotic apparatus may lift and/or slide one or more documents. The robotic apparatus may utilize friction, pneumatic mechanisms, magnets, electromechanical components, and/or any other techniques to feed the documents to the shredder.

The documents may be removed from the warehouse. The documents may be removed with aid of a truck 31 or any other type of vehicle. The documents may be removed in an intact form, or in waste form. For example, the shredded documents may be received by the truck and removed from the facility. In some embodiments, the documents may be removed from the shredder and loaded onto the vehicle automatically without requiring human intervention. For instance, a robotic apparatus may aid with transferring the shredded documents to the vehicle. Alternatively, the shredded documents may be loaded with aid of a human.

The systems and methods described herein may allow for accurate digital copying of physical documents. Paper records may that contain written or printed information may sometimes include one-of-a-kind records, such as legal, financial or historic records, or personal records, which may be irreplaceable. A need exists to preserve such records in digital form. Paper copies may become lost or damaged, and make take up space. Digital copies may be backed up and/or accessible from various locations, and may not take up the same amount of physical space.

The systems and methods provided herein advantageously permit the digitization of records without requiring that the papers be on sheets that are discrete, uniform, and singulated. Instead, the systems and methods provided herein may be capable of digitizing a variety of documents. Starting with bound volumes or attached groups of paper, an automated process may be applied to separate the groups into individual sheets, and then present them to a scanner for conversion to digital files. Any or all of this process may be automated.

Figure 3:
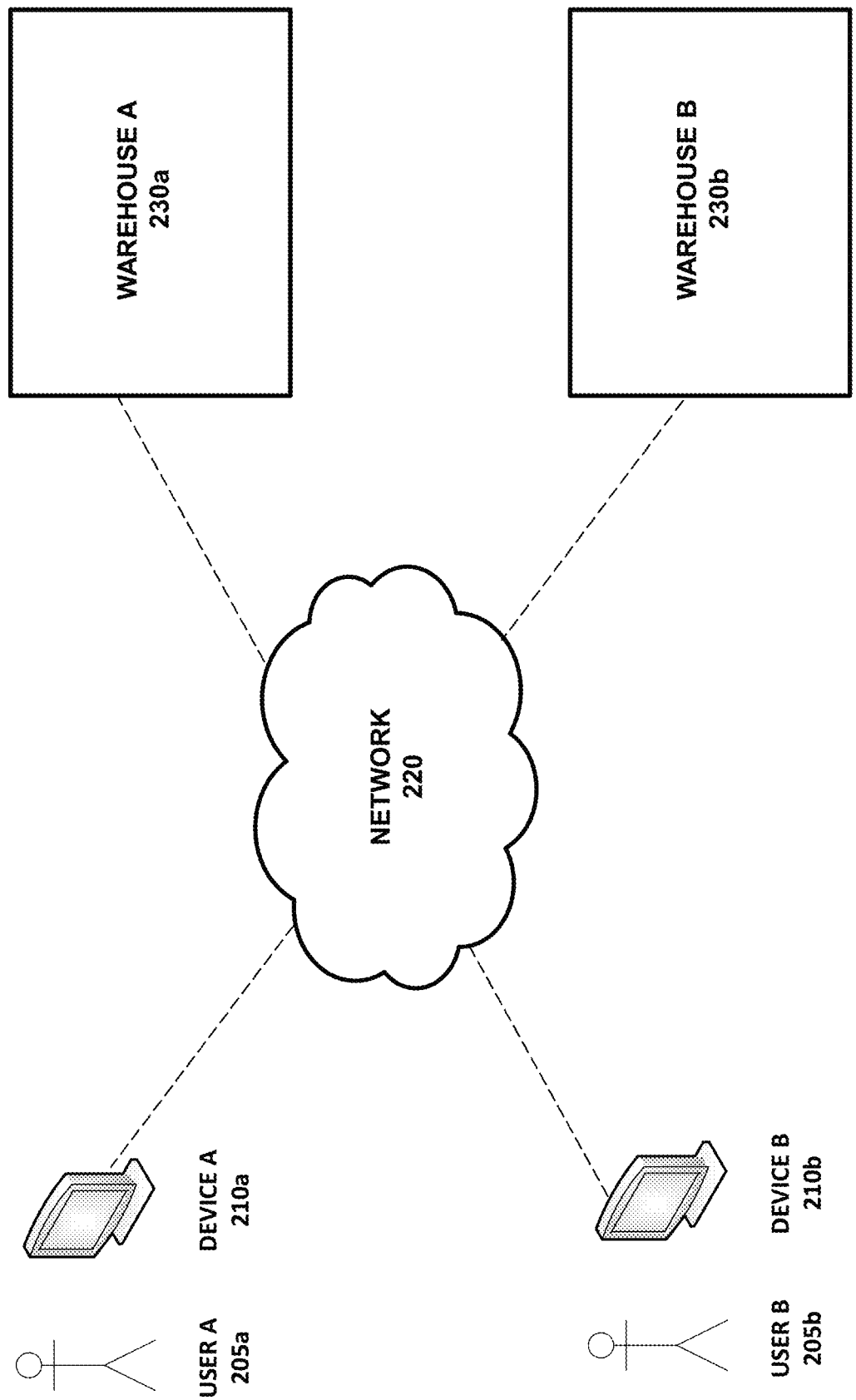
FIG. 3 is an illustration of remote access to one or more warehouses for controlling document scanning or record management in accordance with embodiments of the invention.

FIG. 3 is an illustration of remote access to one or more warehouses for controlling document scanning or record management in accordance with embodiments of the invention. A digital document management system may be integrated with a warehouse management system to manage contents and location of containers/documents as well as the process of digitization and coordinating access to specific pages of digitally imaged records.

An access system may comprise one or more devices 210a, 210b. The one or more devices may be capable of communicating with one or more facilities, such as one or more warehouses 230a, 230b. The communications may occur over a network 220. One or more users 205a, 205b may interact with the one or more respective devices.

One or more devices 210a, 210b may be provided as part of an access system. The one or more devices may be one or more computing devices. Examples of devices may include, but are not limited to personal computers (e.g., laptop or desktop PC), servers, or mobile devices (e.g., mobile phones, smartphones, tablets, or personal digital assistants), or any device capable of forming a network connection.

The one or more devices may comprise a user interactive device which may allow one or more respective users 205a, 205b to interact with the one or more devices. The user interactive devices may receive an input from a user. Examples of user interactive devices may include, but are not limited to a touchscreen, mouse, keyboard, joystick, trackball, touchpad, button, microphone, camera, motion sensor, or any other interactive device.

The one or more devices may comprise a display that may show information to the user. The display may be a screen. In some instances, the display may be a touchscreen. The display may show information relating to a status of one or more apparatuses at one or more warehouses. The display may show information relating to one or more electronic versions of one or more documents. For instance, the display may show digital copies of one or more documents that have been scanned at one or more warehouses.

The one or more devices may comprise one or more processors and/or one or more memory storage units. The one or more memory storage units may comprise non-transitory computer readable medium comprising code, logic, or instructions for performing one or more steps. The one or more processors may be capable executing one or more steps in accordance with the non-transitory computer readable medium.

The one or more devices may comprise one or more communication units that may permit the one or more devices to comprise with one or more other devices. In some instances, the devices may communicate over a network 220. The network may be a local area network (LAN), a wide area network (WAN), such as the Internet, or any type of telecommunications network. Alternatively or in addition, the devices may directly communicate with one or more other devices. A peer-to-peer infrastructure, or a cloud computing infrastructure may be employed.

The one or more devices may communicate with one or warehouses 230a, 230b. The one or more warehouses may comprise a document intake section, a document storage section, a document digitization section, and/or a document removal section as described elsewhere herein. The one or more warehouses may comprise any characteristics or traits of any document management system as described elsewhere herein.

The one or more devices may be within a warehouse with which it may communicate. Alternatively, it may be remote to the warehouse with which it may communicate. In some instances, a device within a first warehouse may communicate with one or more components of the first warehouse. Optionally, the device within the first warehouse may communicate with one or more components of a second warehouse. The device may be remote to the second warehouse. The device may communicate with a device of the second warehouse, or directly with any component of the second warehouse. One or more devices that may communicate with one or more warehouses may not be within any warehouse at all. In some embodiments, an individual device may only be capable of communicating with a warehouse with which it, or a user of the device is associated with. Alternatively, an individual device may be capable of communicating with multiple warehouses (e.g., with which it or a user of the device is associated, at which a user of the device has an association with one or more electronic documents, or without regard to associations of the device or user).

One or more devices may communicate with one or more control computers of a warehouse. The one or more devices may communicate with a records management system of a warehouse. For instances, the one or devices may be capable of accessing one or more electronic versions of documents. The one or more devices may be able to communicate with a document scanning system of a warehouse. For instance, the one or more devices may be capable of controlling an action relating document scanning at the warehouse and/or gather information about document scanning at the warehouse. For instance, the devices may be capable of accessing information about a status of one or more apparatus and/or one or more documents at the warehouse.

One or more devices may communicate with one or more apparatuses at a warehouse. The one or more devices may communicate directly with the one or more apparatuses at a warehouse or may communicate with one or more apparatuses through one or control computers of the warehouse. The one or more control computers may be physically located at the warehouse or may be located remotely to the warehouse. The one or more devices may issue commands that may affect operations of one or more apparatus at a warehouse. The one or more apparatuses may include any of the robotic assemblies described, detection systems, communication apparatuses, transport vehicles, or any other apparatus at a warehouse. The communications between a device and one or more apparatuses may be one-way communications (e.g., from the apparatus to the device to show information about the apparatus, or from the device to the apparatus to control the apparatus). The communications between the device and one or more apparatus may be two-way communications.

A user 205a, 205b of a device may directly interact with the user's respective device. The user may access a digital document management system over a network (e.g., through the cloud). The user's device may have a browser or application, and a network connection to one or more digital storage systems (e.g., cloud storage) and/or servers.

A user may be a human operator. The user may be an individual authorized to view one or more electronic versions of documents that have been digitized. For example, a user may be an individual that provided the physical versions of the documents that have been digitized. The user may be an employee or otherwise associated with an entity that provided the physical versions of the documents that have been digitized. The user may be authorized by an entity that provided the physical versions of the documents that have been digitized. The user may be an employee of an entity that controls operations of the warehouse. In some instances, one or more users may view the digital versions of the documents to perform a quality check. In some instances, the employees of the entity that controls operations of the warehouse may not be authorized or allowed to access the electronic versions of the documents. Unauthorized individuals may not be able to view electronic versions of documents that have been digitized. Unauthorized individuals may be prevented from accessing electronic versions of the documents.

An authorized user may view the electronic versions of the documents. In some instances, an identity of a user may be verified prior to permitting the user to access the electronic versions of the documents. A user may need to be authenticated to confirm that the user is an authorized individual to access the electronic versions of the documents, prior to allowing the user to access the documents.

The authorized user may be able to perform one or more actions relating to the documents. For instance, the authorized user may be able to download the documents, print the documents, edit the documents, redact the documents, reorder pages in the documents, share the documents, publish the documents, or perform any other actions relating to the documents. The user may be able to access the documents associated with the user and/or an entity that the user is associated with. The user may not be able to access documents that are associated with a different user or different entity.

The user may be an individual associated with the warehouse. The user may be an employee of an entity that controls operations of the warehouse. The user may be an operator of one or more apparatuses at the warehouse. The user may be a manager that may oversee operations at the warehouse. The user may or may not be on-site at the warehouse. The user may view information about operations at the warehouse. For instance, the user may view information about the operators and/or status of one or more apparatuses at the warehouse. The user may view information relating to any detected error condition. The user may information about an operation, status, and/or location (e.g., in real-time) of a transport vehicle.

The user may optionally provide input that may affect operations at a warehouse. For instance, the user may provide an instruction that may affect operation of an apparatus (e.g., robotic apparatus, transport vehicle) at a warehouse. The instruction may directly manually affect operation of the apparatus. For instance, a command from a user may result in a corresponding real-time action or motion by the apparatus. The instruction may indirectly affect operation of the apparatus. For instance, a command from a user may initiate a sequence of events in response to the command, or may determine a parameter that the apparatus may operate within a semi-autonomous or autonomous manner.

The user may view information about containers (and/or physical documents) that have been identified. The user may detect the status of the documents in the container (e.g., whether they have been digitized), and/or their location (e.g., specific location within a storage section, or which section within the warehouse).

The user may optionally provide input that may affect a status of a container (and/or physical documents). For instance the user may provide instructions that may cause the container to enter a particular phase of processing. For example, the user may provide instructions that may cause a container in a storage section, to be brought to the document digitization section. In another example, the user may provide instructions that may cause a container in a storage section or document digitization section, to enter a document removal section. The user may provide instructions that direct where the container is to go. The user may provide instructions that may include parameters that may affect the status of a container. For example, the user may define different priority levels for various containers, which may affect a timing or order in which the documents within the containers are scanned. Documents with a higher priority may be digitized sooner than documents with a lower priority.

A user may provide instructions that may affect rules or retention of documents that have been digitized. For instance, a user may be able to command a document management system to establish a set of rules related to automatic retention of previously scanned containers and/or documents. The document management system may be capable of automatically determining a type of document, and may assign a document retention schedule based upon industry rules for the document type. In some instances, a document type may be indicated by a source of the physical documents. For example, an entity providing a set of documents may indicate they are tax records. In another instance, the system may be able to detect a document type. For instance, once a document has been imaged, software analysis of the document may indicate that the document is a particular document type. One or more processors may make the determination of the document type in an automated fashion without requiring human intervention. For example, image recognition techniques may recognize a tax document vs a medical record, and so forth. The document type may be selected/determined from a plurality of document category types. For instance, a pre-set group of available document types may be provided. The document may be classified as falling into one or more types from the pre-set group. An indication may be provided if the document requires further analysis or falls outside the pre-set group. In some instances, for records-keeping or legal purposes, a document may need to be retained for a certain period of time (e.g., on the order of hours, days, weeks, months, years, decades). Based on the requirements for a particular document type, an automated retention schedule may be provided to make sure the physical document does not get shredded or destroyed prior to the end of the required retention period. The retention period for each document type may be provided automatically and uniformly in accordance with accounting/legal requirements. As rules may change overtime, a software update may be provided that may update the retention periods automatically.

In some instances, a user may specify the retention period for each document type. For instance, a user may wish to keep a document for a period longer than the minimum legal requirement. The user may wish to keep certain types of documents for certain periods of time, and the user may have the flexibility to determine the times for the various document types. For certain documents, the retention period may not have an indicated end date. The document retention may be differentiated based on document type, document classification provided by the user, media type (e.g., format of physical document), or any other parameter of the document.

A user may be able to command a document management system to shred a previously digitized set of documents. For instance, if contents of a container were already scanned, the user may issue commands that cause the contents to be shredded. The user commands may directly cause the contents to be shredded, or the contents may be shredded automatically after a time indicated by the user.

Figure 4:
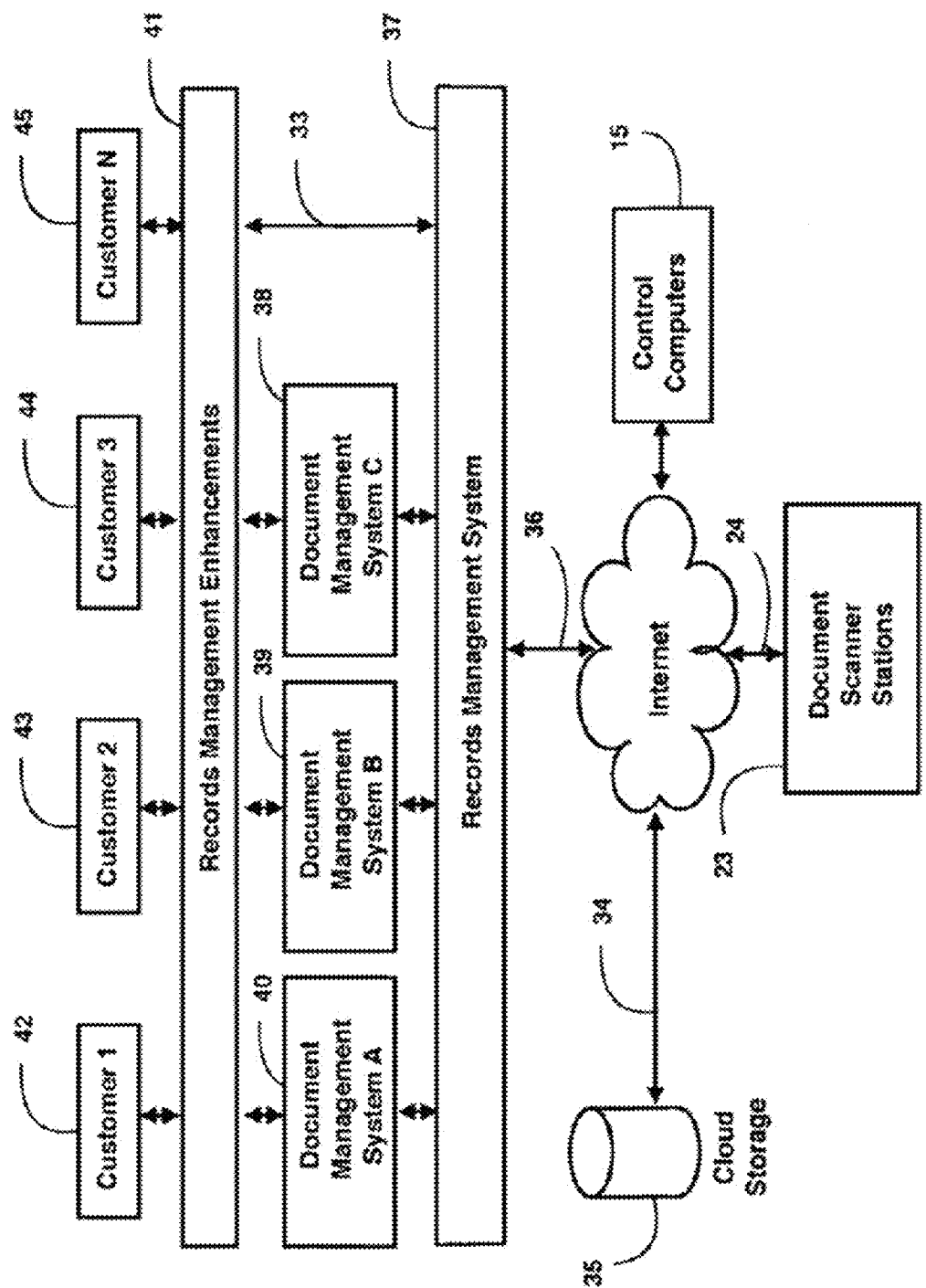
FIG. 4 is a functional diagram of a digital document management system and record management system in accordance with an embodiment of the invention.

FIG. 4 is a functional diagram of a digital document management system and record management system in accordance with an embodiment of the invention.

As previously described, one or more control computers 15 may be provided for a document management system. The one or more control computers may be provided at a document management facility, external to the one or more document management facility, or any combination thereof. In some instances, a peer-to-peer or cloud computing type infrastructure may be utilized.

The one or more control computers may direct one or more document scanner stations 23 to electronically send document files 24 over an Internet connection 34 to a cloud storage 35.

The one or more document scanner stations may be part of a document digitization section. The one or more control computers may direct any portion of a document digitization section to provide the electronic versions of the document files. The one or more control computers may or may not directly control a document preparation, fastener recognition, fastener removal, or document scanning process. The one or more document scanner stations may be at the same facility as the one or more computers. Alternatively or in addition, the one or more document scanner stations may be at a different facility from the one or more computers. The document scanning stations may be directly controlled by the one or more computers. Alternatively, the one or more document scanning stations may be able to operate autonomously or semi-autonomously to provide the document files.

The document files may comprise electronic version of the physical documents that have been digitized. The document files may be stored in any format. The document files may be stored in an editable or non-editable format. The document may or may not be searchable. The document files may have an image format, a pdf format, a text format, any other format, or any combination thereof. An individual document file may correspond to a single physical document. Alternatively, an individual document file may correspond to an entire container full of documents. A document file may correspond to a single page of a physical document. In some instances, a document file may comprise one, two or more pages. The document file may correspond to a document comprising a single page, or multiple pages that have been fastened together.

The document file may comprise information in addition to the digital version of the physical document. The information may comprise metadata, which may include information relating to the original physical document. For example, the metadata may include, but is not limited to, a source of the physical document (e.g., entity that provided the physical document, location from which the physical document arrived), a date/time at which the physical document was received at a warehouse, a date/time at which the physical document was converted into the digital format, a classification for the document, information about any processes that were utilized to digitize the document, information about individuals or entities who have access to the digital version of the document, information about when or where a digital document was last accessed, viewed or edited, or any other information. Alternatively, the metadata may be provided separately and/or may be combined or associated with the document file.

The document digitization section may send the document files to one or more memory storage units. The documents may be sent directly to the one or more memory storage units, or over a network, such as the Internet, or any other type of network described elsewhere herein. The memory storage units may comprise one or more databases. The memory storage units may be provided using a cloud computing infrastructure. The document files may be stored in cloud storage. The memory storage units may be distributed over one or more locations. A memory storage unit may or may not be at the same facility as a document scanning apparatus. In some embodiments, one or more memory storage unit may be located at the same facility while one or more memory storage units are located outside the facility (e.g., at other facilities or locations). The document files may be accessible from the facility or from outside the facility. The document files may be accessible from any location. Any description herein of cloud storage may apply to any type of memory storage system for the one or more document files.

A records management system 37 may access 36 the cloud storage 35. The records management system may be able to access the document files. The records management system may combine metadata from the control computers with information accessed from the cloud storage. In some instances, the metadata from the control computers may include information captured by an apparatus, such as a barcode reader 56. The metadata may include information about a container holding the original physical documents, a source of the physical document (e.g., entity that provided the physical document, location from which the physical document arrived), a date/time at which the physical document was received at a warehouse, a date/time at which the physical document was converted into the digital format, a classification for the document, information about any processes that were utilized to digitize the document, information about individuals or entities who have access to the digital version of the document, information about when or where a digital document was last accessed, viewed or edited, or any other information.

The records management system may or may not have a front end that may allow a user to interact with a document file through the records management system. A records management system may optionally allow a user to perform one or more actions relating to the documents. For instance, the authorized user may be able to download the documents, print the documents, edit the documents, redact the documents, reorder pages in the documents, share the documents, publish the documents, or perform any other actions relating to the documents. The user may be able to access the documents associated with the user and/or an entity that the user is associated with. The user may not be able to access documents that are associated with a different user or different entity. Alternatively, the records management may not have a front end. The records management system may communicate with other systems that have a front end and permit user interaction.

A records management system may permit one or more third party document management systems 38, 39, 40 to access the documents and/or records. The third party document management systems may be able to access the document files and/or any associated metadata. The third party document management systems may be able to access the records management system on the back end so a user of the third party document management system may have a seamless experience within the third party document management system environment. The various third party document management systems may be the same or different. They may have the same features and/or characteristics, or various different features and/or characteristics. The third parties may or may not be the same third parties that provided the original physical documents. In some instances, a third party's document management system may be able to access document files from the records management systems for documents they provided. Their document management system may not be able to access another third party's document files through the records management systems.

The third party document management system may be able to perform any action relating to the document files. For instance, the third party document management system may allow a user to perform one or more actions relating to the documents.

For instance, the authorized user may be able to view the documents, download the documents, print the documents, edit the documents, redact the documents, reorder pages in the documents, share the documents, publish the documents, or perform any other actions relating to the documents. A user may be able to search for a particular document or type of document. A user may be able to search for particular content that can be found on a document. A records management system or a document management system may offer search methods to identify words, phases, or associations in the content of the digital document files and/or the metadata. In some instances, natural language processing (NLP) and/or contextual search may be used to identify words, phrases, or associations in the document files and/or associated metadata. A records management system or document management system may employ analytical tools to explore the contents of the document files and/or metadata.

The user may be able to access the documents associated with the user and/or an entity that the user is associated with. The user may not be able to access documents that are associated with a different user or different entity Alternatively, third parties may not be granted access to the records management systems. The overall process may be able to operate without the third party document management systems.

Further records management enhancements 41 may be provided. The management enhancements may be provided for managing, searching, analyzing, evaluating and extracting information. These enhancements may be available to customers 42, 43, 44, 45. In some instances, the enhancements may be made available to customers for a fee. Alternatively, any customers may be able to access the enhancements. The enhancements may include special searching features that may make it easier to locate a particular document file from other document files. A user may be able to search for a document file based on document title, date, source, classification, keywords, or any other characteristic. The enhancements may include special editing features. For instance, the user may be provided flexibility in adding, removing, redacting pages, lines, text, figures, or other portions of the documents. The user may be able to alter the format or file type of the document.

Customers may be individuals who may be authorized to access the documents. The customers may be entities that are authorized to access the documents. The customers may include an entity and/or individual associated with the entity (e.g., employee). The customers may or may not have originally provided the physical documents for digitization. The customers may be able to access the digital version of the documents that they provided. They customers may or may not be able to access the digital version of documents provided by others.

Customers may or may not be able to view information about warehouse operations. The customers may or may not be able to view information about a status and/or location of their physical documents. The customers may or may not be able to provide an input that affects the status and/or location of their physical documents.

The systems and methods described herein may permit handling of documents and digitization thereof. Many methods and apparatus for handling documents and/or boxes of documents, and resulting records (e.g., electronic records) are possible, but some may be overly complex, impractical, not cost-effective, or may endanger human health. Systems and methods provided herein may allow for safe, efficient, and/or cost-effective techniques for document digitization. For instance, automation may allow for decreased risk to human health or safety. The automation may also provide a reduced need for human presence, which may reduce costs and/or delays associated with human intervention. Furthermore, the automation may reduce the likelihood of human mistake.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for processing a plurality of documents, comprising:
    a) providing the plurality of documents and a document identifier;
    b) reading the document identifier to generate document processing instructions, wherein the document processing instructions comprise a predetermined document retention schedule for the plurality of documents;
    c) digitizing individual pages of the plurality of documents to generate one or more digitized documents;
    d) storing the one or more digitized documents on a document management system; and
    e) executing the predetermined document retention schedule to the plurality of documents, wherein the predetermined document retention schedule is executed in an automatic fashion without human intervention in accordance with a set of rules established by a human operator.

2. The method of claim 1, wherein document processing instructions further comprise an entity identifier associated with an individual or an entity that is permitted to manage, search, and/or analyze at least one digitized document of the one or more digitized documents.

3. The method of claim 2, further comprising permitting the individual or the entity associated with the entity identifier to manage, search, and/or analyze at least one digitized document of the one or more digitized documents.

4. The method of claim 3, wherein the individual or the entity is permitted to manage, and/or analyze the at least one digitized document through a records management system.

5. The method of claim 4, wherein the individual or the entity is permitted to manage, and/or analyze the at least one digitized document through a front end of the records management system.

6. The method of claim 4, wherein the individual or the entity is permitted to manage, and/or analyze the at least one digitized document through a back end of the records management system.

7. The method of claim 6, wherein the records management system does not have a front end.

8. The method of claim 4, wherein one or more documents are stored on cloud storage.

9. The method of claim 8, wherein the records management system is configured to access cloud storage.

10. The method of claim 1, wherein the document processing instructions further comprise a plurality of destinations for the plurality of documents.

11. The method of claim 10, further comprising transporting the plurality of documents to a first destination in the plurality of destinations.

12. The method of claim 11, further comprising transporting the plurality of documents from the first destination to a second destination, wherein the second destination is one of the plurality of destinations.

13. The method of claim 1, further comprising storing the predetermined document retention schedule on the document management system.

14. The method of claim 1, further comprising storing a date/time of when the one or more digitized documents are generated.

15. The method of claim 1, further comprising storing a location from where the plurality of documents provided.

16. The method of claim 1, further comprising storing a classification for the plurality of documents.

17. The method of claim 16, wherein the classification is at least one of: paper, card stock, file folders, cardboard, acetate film, polyester film, X-ray film, synthetic paper, microfiche, tissue paper, blueprints, maps, cloth, or parchment.

18. The method of claim 1, wherein the document identifier is provided on a surface of at least one document in the plurality of documents.

19. The method of claim 1, wherein the document identifier is provided on a surface of a container, wherein the plurality of documents is contained within the container.

20. The method of claim 1, wherein the document identifier is a barcode.

* * * * *